(12) United States Patent
Wiemker et al.

(10) Patent No.: US 7,356,173 B2
(45) Date of Patent: Apr. 8, 2008

(54) ANALYSIS OF PULMONARY CT DATA

(75) Inventors: Rafael Wiemker, Kisdorf (DE);
Thomas Blaffert, Hamburg (DE);
Vladimir Pekar, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 216 days.

(21) Appl. No.: 10/560,321

(22) PCT Filed: May 8, 2004

(86) PCT No.: PCT/IB2004/050805

§ 371 (c)(1),
(2), (4) Date: Dec. 9, 2005

(87) PCT Pub. No.: WO2004/109580

PCT Pub. Date: Dec. 16, 2004

(65) Prior Publication Data

US 2007/0098242 A1    May 3, 2007

(30) Foreign Application Priority Data

Jun. 11, 2003    (EP) .................................. 03101699

(51) Int. Cl.
G06K 9/00    (2006.01)
(52) U.S. Cl. ..................... 382/128; 382/131
(58) Field of Classification Search ................ 382/128, 382/131
See application file for complete search history.

(56) References Cited

U.S. PATENT DOCUMENTS

| 6,466,687 | B1* | 10/2002 | Uppaluri et al. ............ 382/182 |
|---|---|---|---|
| 6,728,334 | B1* | 4/2004 | Zhao ............................ 378/62 |
| 2002/0028008 | A1 | 3/2002 | Fan et al. .................... 382/131 |
| 2002/0114503 | A1 | 8/2002 | Klotz et al. ................. 382/131 |
| 2004/0151356 | A1* | 8/2004 | Le et al. ...................... 382/131 |
| 2004/0252870 | A1* | 12/2004 | Reeves et al. ............... 382/128 |

FOREIGN PATENT DOCUMENTS

| WO | WO 01/78005 A2 | 10/2001 |
|---|---|---|
| WO | WO 02/085211 A2 | 10/2002 |
| WO | WO 2004/046995 A2 | 6/2004 |

OTHER PUBLICATIONS

Delorme et al., Usual interstitial pneumonia. Quantitaive assessment of high-resolution computed tomography finding by computer-assisted texture-based image analysis, Sep. 1997, Investigative Radiology, pp. 566-574.*

(Continued)

*Primary Examiner*—Bhavesh M. Mehta
*Assistant Examiner*—John B. Strege

(57) ABSTRACT

Ground glass opacities in the lung are non-solid nebular-like shadows in the parenchyma tissue of the lung, which may be precursors of a lung cancer. According to the present invention, ground glass opacities may automatically be determined on the basis of a texture analysis of the parenchyma. Advantageously, according to the present invention, a robust and reliable determination of ground glass opacities may be provided, even if vessels, lung walls, airspace or bronchi walls are present within the local neighborhood of the ground glass opacity.

19 Claims, 5 Drawing Sheets

OTHER PUBLICATIONS

Ezoe, T., et al.; An Automatic Detection Method of Lung Cancers Including Ground Glass Opacities; 2002; Proc. Of SPIE; vol. 4684: 1672-1680.

Kauczor, H., et al.; Automatic Detection and Quantification of Ground-Glass Opacities; 2000; AJR; 175:1329-1334.

Kawata, Y., et al.; Computerized Analysis of 3-D Pulmonary Nodule Images in Surrounding And Internal Structure; 2001; Proc. Of IEEE; 889-892.

Kemerink, G.J., et al.; On segmentation of lung parenchyma in quantitative computed Tomography of the lung; 1998; Med. Phys. 25(12):2432-2439.

McNitt-Gray, M.F., et al.; A pattern classification approach to characterizing solitary pulmonary Nodules; 1999; Med. Phys; 26(6):880-888.

Mitani, Y., et al.; Combining the Gabor and Histogram Features for Classifying Diffuse Lung Opacities; 2002; Proc. Of IEEE; pp. 53-56.

Qian, J., et al.; Knowledge-based Automatic Detection of Multi-type Lung Nodules; 2002; Medical Imaging Proc. of SPIE; vol. 4684:689-697.

Tanino, M., et al.; A Detection Method of Ground Glass Opacities in Chest X-Ray CT Images; 2003; Proc. Of SPIE; vol. 5032; pp. 1728-1737.

* cited by examiner

ANALYSIS OF PULMONARY CT DATA

The present invention relates to the field of medical digital imaging. In particular, the present invention relates to a method for analyzing pulmonary three-dimensional CT data, to an image processing device for analyzing pulmonary three-dimensional CT data and to a computer program for analyzing pulmonary three-dimensional CT data.

In countries around the world, the death rate by lung cancer is increasing and is even rated as top rank for males in some countries. In order to decrease the death rate, mass screening for lung cancer is widely performed by simple chest x-ray film and sputum cytology. However, the detection ability by a simple x-ray film is not sufficient for early detection of lung cancer. It is known that the false negative ratio of the mass screening is considerably high.

US 2002/0028008 A1 and WO 02/085211 A2 respectively disclose methods for automatically detecting lung nodules from MSHR CT images. The lung nodules, which may be detected by these methods, are solid nodules. Solid nodules consist of compact hard tissue. In the CT images, these solid nodules have a brightness, which may be compared to the brightness of blood vessels. Usually, such solid nodules cause Hounsfield units larger than −400 HU.

According to recent findings, irregularities in the tissue, i.e. in the lung tissue, called ground glass opacities (GGO) are early indicators for the development of lung cancer. Such ground glass opacities are often also referred to as ground glass nodules or sub-solid nodules. In contrast to the solid nodules, these ground glass opacities consist of irregular tissue, supplied by blood vessels which are thinner than the usual resolution limit of CT. A structure of the ground glass opacities corresponds to a sponge, since the tissue of these ground glass opacities comprises spaces or cavities filled with air.

Due to the fact that CT cannot resolve these air spaces, due to, amongst other things, the fact that these air spaces are smaller than 0.5 mm×0.5 mm, which is the approximate resolution limit of today's CTs, these ground glass opacities appear indistinct in the CT images. The appearance of these ground glass opacities in the CT images is even nebulous and usually the corresponding pixels in the images corresponds to a mean density of less than −400 HU.

Thus, it is very difficult for even a highly trained physician to locate these ground glass opacities.

Toshiharu Ezoe et al, "An automatic detection method of lung cancers including ground glass opacities from chest x-ray CT images", Medical Imaging 2002: Image Processing, Proceedings of SPIE Vol. 4684 (2002) describes an algorithm of automatic detection of ground glass opacities from x-ray CT images. In this algorithm, at first pathological shadow candidates are extracted by a variable N-Quoit filter, which is a kind of mathematical morphology filter. Next, shadow candidates are classified into some classes using feature values calculated from the shadow candidates. By using discriminate functions, at least, shadow candidates are discriminated between normal shadows and abnormal ones. Disadvantageously, this algorithm may only be applied to CT data consisting of 30 slices or less, due to the required amount of calculations. Otherwise, the speed of the algorithm would not be sufficient.

H. -U. Kauczor et al (Automatic detection and quantification of ground glass opacities on HRCT scans of the lung: comparative study of a neural network, visual assessment and a density mask", European Congress of Radiology in Vienna 1999 described the detection of ground glass opacities in HRCT scans having a slice thickness of 1-2 mm. Due to the application of a neural network, such detection method is complicated and often unstable.

It is an object of the present invention to provide for an improved detection of ground glass opacities.

According to an aspect of the present invention, the above object may be achieved by a method according to claim 1 for analyzing pulmonary three-dimensional CT (computer tomography) data. The three-dimensional CT data include a plurality of two-dimensional slice images consisting of image elements such as pixel, wherein values of the image elements correspond to Hounsfield units.

The three-dimensional CT data is loaded, for example, into the internal memory of a processor, and then a detection of ground glass opacities is performed in the plurality of two-dimensional slice images of the three-dimensional CT data. According to an aspect of the present invention, the detection of ground glass opacities is based on a texture analysis.

Advantageously, the above method may allow to detect ground glass opacities in spite of their low Hounsfield values, which makes them particularly difficult to spot in the usual CT lung window/level setting. Furthermore, the above method may allow for an automatic detection of these ground glass opacities and thus for a mass screening of patients. Due to the possible early detection of these indicators for a possible lung cancer, advantageously a timely therapy against a possibly developing lung cancer may be planned and performed.

According to another exemplary embodiment of the present invention as set forth in claim 2, the texture analysis includes the step of determining a typical Hounsfield value of a local pulmonary parenchyma on the basis of a peak of a texture-based roughness histogram.

According to another exemplary embodiment of the present invention as set forth in claim 3, the texture analysis includes a computation of a typical parenchyma Hounsfield value of the lung and a marking of all areas in the lung area with a Hounsfield value higher than the typical parenchyma Hounsfield value.

Advantageously, the exemplary embodiments of the present invention set forth in claims 2 and 3 provide for a relatively simple but very robust detection of the ground glass opacities. Furthermore, due to the fact that these methods require only a reduced amount of calculation steps, very fast methods may be provided.

Claims 4 to 6 provide further exemplary embodiments of the present invention, which allow for a fast and reliable determination of ground glass opacities in pulmonary three-dimensional CT data.

According to another exemplary embodiment of the present invention as set forth in claim 7, an image processing device is provided, adapted to perform an operation corresponding to the method of claim 1. Advantageously, the image processing device according to this exemplary embodiment of the present invention provides for a very fast and automatic determination of ground glass opacities in the pulmonary three-dimensional CT data.

Claims 8 and 9 provide for further exemplary embodiments of the image processing device according to the present invention.

According to another exemplary embodiment of the present invention as set forth in claim 10, a computer program for analyzing pulmonary three-dimensional CT data as set forth in claim 10 is provided. The computer program may be written in any suitable programming language, for example, C++ and may, for example, be stored on a computer readable medium, such as a CD-ROM. Also the computer program may be available from a network, such as the WorldWideWeb, from which is may be downloaded into an image processing unit or processor or any suitable computer.

It may be seen as the gist of an exemplary embodiment of the present invention that ground glass opacities are detected by virtue of a texture analysis of the parenchymal tissue. Following an automated segmentation of the lung out of the overall thorax dataset, all image elements or pixel above a Hounsfield threshold of approximately −700 HU, which are not attached to a solid lung structure, such as vessels, bronchi or lung wall, are taken as centers of a local neighborhood in which a roughness-histogram is computed. A peak of this roughness-histogram yields a typical Hounsfield value of the lung parenchyma in this neighborhood. In case the peak value is above approximately −700 HU, this point is marked as a center of a potential ground glass opacity. In case several such local neighborhoods overlap, they may be combined in an area with the center at the highest mean parenchyma Hounsfield value.

These and other aspects of the present invention will become apparent from and elucidated with reference to the embodiments described hereinafter.

Exemplary embodiments of the present invention will be described in the following, with reference to the following drawings:

FIG. 1 shows a schematic representation of an image processing device according to an exemplary embodiment of the present invention, adapted to execute an exemplary embodiment of a method according to the present invention.

FIGS. 2*a* and 2*b* show a flowchart of an exemplary embodiment of a method of operating the image processing device according to the present invention.

Figure 1:
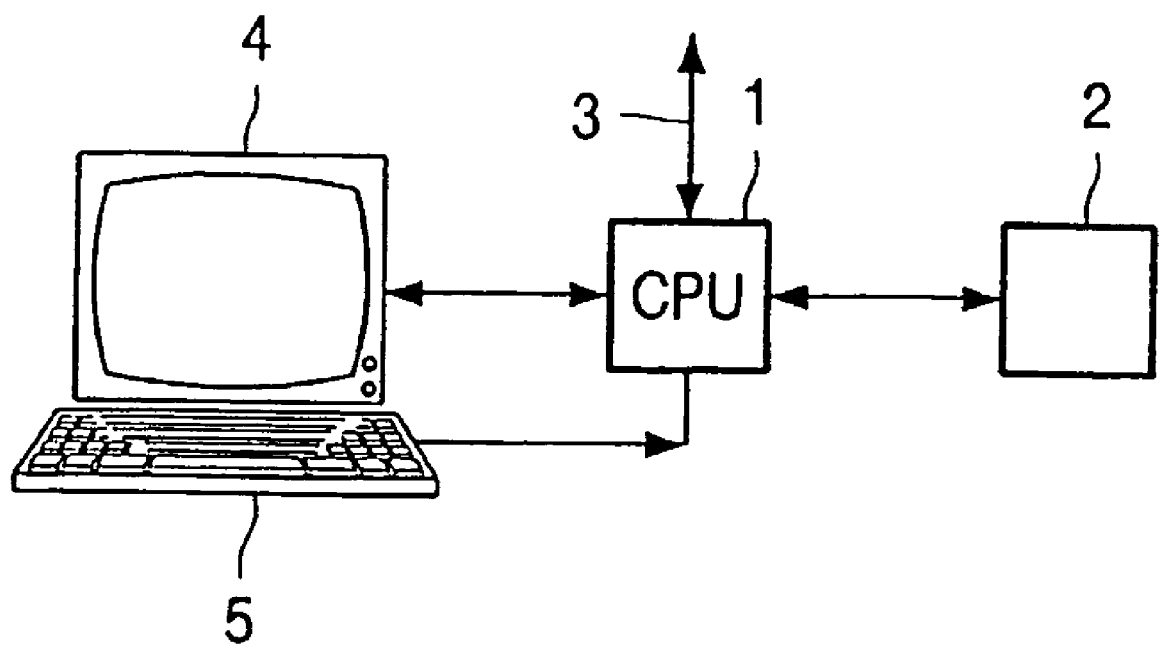

FIG. 1 shows an exemplary embodiment of an image processing device according to the present invention. The image processing device shown in FIG. 1 includes an image processing and control processor 1 with a memory 2, in which three-dimensional CT data and intermediate data generated during operation may be stored. The image processing and control processor (CPU) 1 may be coupled via a bus system 3 to an imaging device (not shown in FIG. 1), for example, to a CT apparatus. An image generated by the image processing and control processor 1 may be displayed to an operator on a monitor 4, connected to the image processing and control processor 1. An operator may access the image processing and control processor via a keyboard 5, or other input means which are not shown in FIG. 1, such as a mouse or a trackball.

Figure 2A:
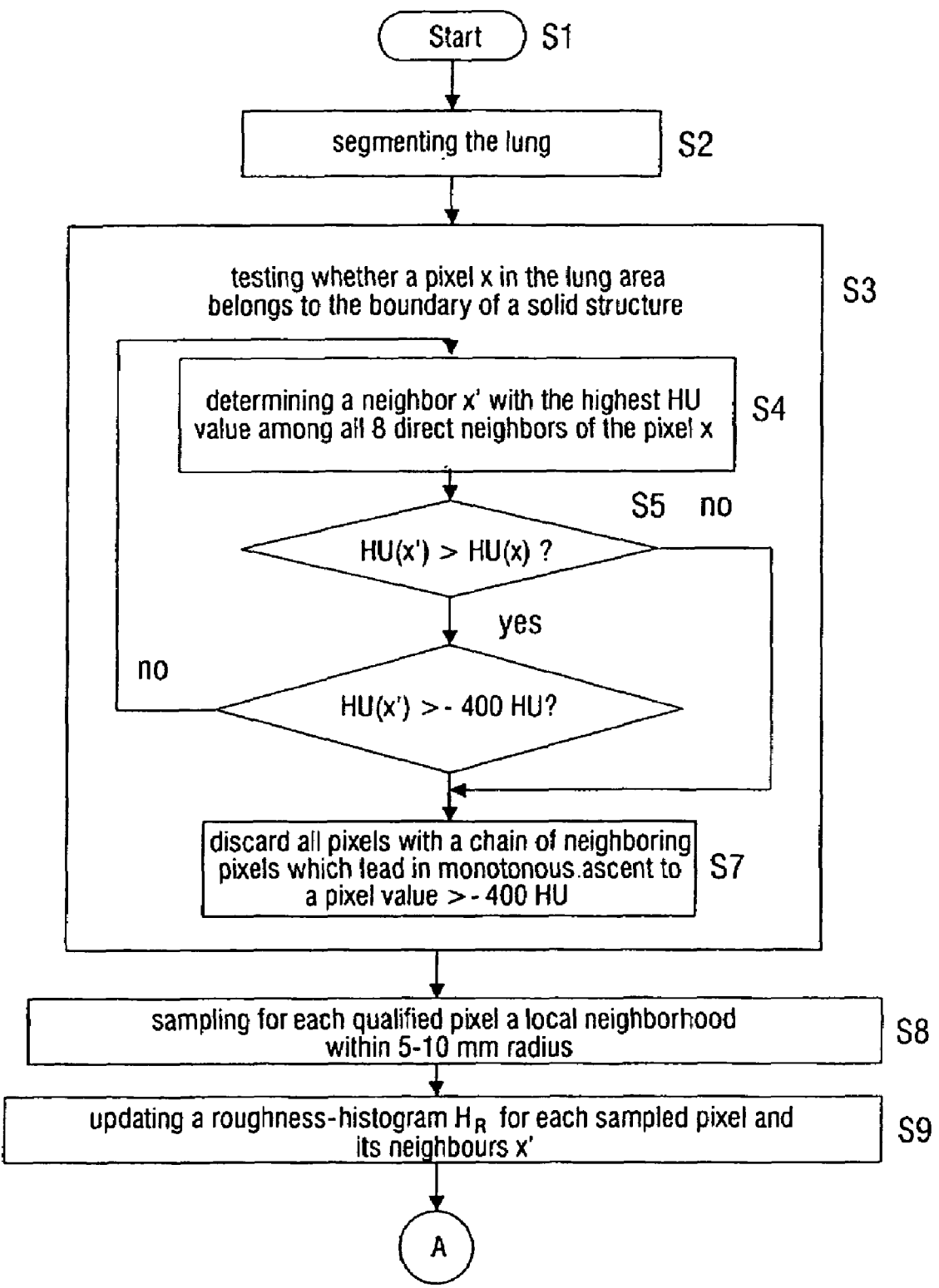
Figure 2B:
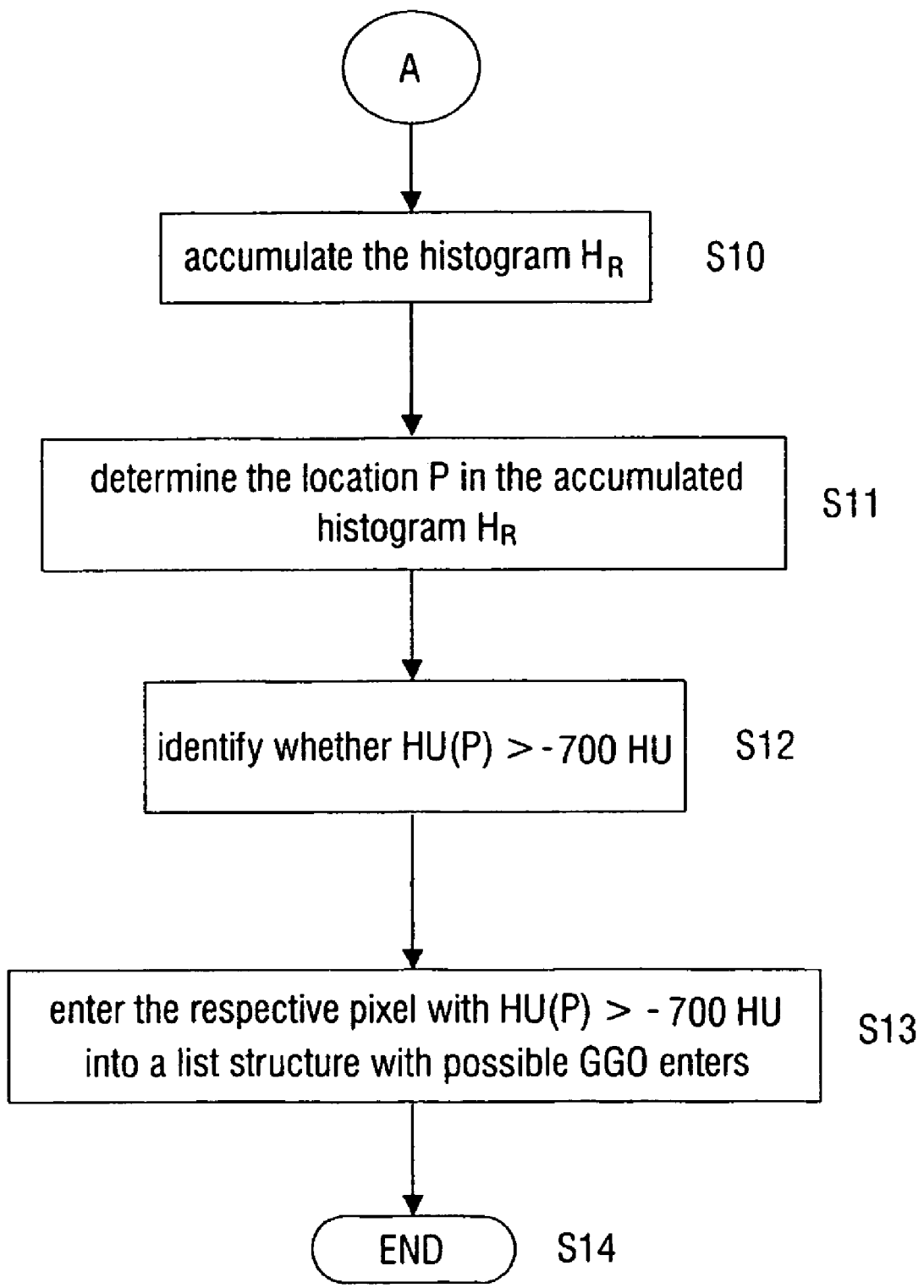

FIGS. 2*a* and 2*b* show a flowchart of an exemplary embodiment of a method for operating the image processing device of FIG. 1. This method is performed for each image slice, i.e. each two-dimensional slice image of the three-dimensional CT data. Each of the two-dimensional slice images consists of image elements, such as, for example, pixels or voxels, which values correspond to Hounsfield units.

After the start in step S1 in FIG. 2*a*, the method continues to step S2, where a segmentation of the lung is performed. The lung is segmented out of, for example, an overall thorax image. This, according to an aspect of the present invention, this can be made by thresholding the slice images at, for example, approximately −400 HU. A surrounding airspace may, for example, be filled by a region growing, such as described, for example, in EP 02079814.6, which is hereby incorporated by reference, which is also suitable for filling small holes.

After the segmentation of the lung in step S2, the method continues to step S3, where a testing is performed, whether a pixel x, which was determined to be part of the lung in step S2, belongs to the boundary of a solid structure in step S3. In other words, for each pixel determined to be part of the lung, which is above approximately −700 HU, but below −400 HU, it is tested whether this pixel belongs to the boundary of a solid structure with Hounsfield values >−400 HU.

According to an aspect of the present invention, the testing, whether a pixel x belongs to the boundary of a solid structure, is performed as set forth in steps S4 to S7. This may be done for all pixels x determined to be a part of the lung.

In step S4, for all eight direct neighbors of the pixel in question x, i.e. all eight pixels neighboring the pixel in question x, a neighboring pixel x' is determined, having the highest HU value among the eight neighboring pixels. Then, the method continues to step S5, where it is determined whether the Hounsfield value of the pixel x' determined in step S4 is higher than the Hounsfield unit value of the starting pixel x. In case it is determined that the Hounsfield unit value of the pixel x' is smaller than the Hounsfield unit value of the starting pixel, the method continues to step S7.

If it is determined in step S5 that the Hounsfield unit value (HU value) is higher than the HU value of the starting pixel x (i.e. the starting pixel of the current iteration), the method continues to step S6, where it is determined whether the HU value of the pixel x' is greater than −400 HU. In case the HU value of the pixel x' is greater than −400 HU, steps S4 to S6 are iterated for all neighbors x' of the pixel x. As may be taken from step S6, the iteration stops if either the HU value of the respective value is above approximately −400 HU, or if no other neighbors can be found with a HU value higher than the HU value of the previous pixel.

Then, in the subsequent step S7, all pixels with a chain of neighboring pixels which lead in a monotonous increase of intensity values to a pixel value >−400 HU are discarded from further consideration for a possible ground glass opacity, since they seem to belong to solid structures with high HU values and are only thinned by the partial volume effect at the boundaries of the structures.

After step S3, including steps S4 to S7, the method continues to step S8, where, for each qualified pixel, i.e. each remaining pixel after the discarding of pixels in step S7, a local neighborhood of pixels within approximately 5 to 10 mm radius is sampled in step S8. Then, the method continues to step S9, where a roughness-histogram $H_R$ is generated or updated for each sampled pixel x and its neighbors x'. In detail, in step S9, for each sampled pixel x and its pixel neighbors x' with the corresponding HU values V and V', the roughness-histogram $H_R$ is generated or updated in the following way:

$$H_R[V]-=1 \;;H_R[V']+=1; \text{ if } V>V'$$

$$H_R[V]+=1 \;;H_R[V']-=1; \text{ if } V<V'$$

After all pixels x' in the neighborhood of pixel x have been sampled, the histogram is accumulated in the subsequent step S10 in FIG. 2b, as indicated with the encircled A at the bottom of FIG. 2a and the encircled A at the top of FIG. 2b. The roughness-histogram $H_R$ is accumulated such that $H_R[V]$ contains the sum of all bins with V'<V. Then, in the subsequent step S11, a location P (in units of HU) of the peak of the cumulated histogram is determined. The peak is considered valid if $H_R[(-1000HU+P)/2]<\frac{1}{2}H_R[P]$. In other words, the peak is considered valid if there is a steep decent from peak down the flanks of the peak towards −1000 HU.

The HU value P is the typical value of the parenchymal lung tissue in this local neighborhood consisting of the pixel x and its eight neighboring pixels. In the subsequent step S12, an identification is made whether the HU value P exceeds approximately −700 HU.

In the subsequent step S13, the pixel x is entered into a list structure with possible ground glass opacity centers, in case it is determined in step S12 that the HU value P is above approximately −700 HU. Then, the method continues to step S14, where it ends.

After steps S1 to S14 have been executed for all two-dimensional slice images of the three-dimensional CT data, the center points of possible ground glass opacities contained in the list structure (see step S13) are consolidated such that all center points, i.e. possible seed points, are erased, which lie in the neighborhood of another seed with a higher typical parenchymal opacity P. After that, the remaining entries in the list structures are output as ground glass opacities. This may, for example, be done by displaying a suitable slice image of the three-dimensional CT data on the display 4 and by marking the center points in the list structure, by, for example, a circle, an arrow or a suitable color or gray value.

Advantageously, due to the detection of ground glass opacities in the plurality of two-dimensional slice images on the basis of the texture analysis, i.e. the texture based roughness-histogram, advantageously, a peak at the typical HU value of the lung parenchyma tissue is even then determined as a ground glass opacity, if vessels, the lung wall, airspace or bronchi walls are present within the local neighborhood of the respective ground glass opacity in which the roughness-histogram is sampled. According to an aspect of the present invention, the solid objects do not show up in the roughness-histogram, because they have relatively smooth valley distributions, whereas the parenchyma tissue typically exhibits a very speckled value distribution.

According to an aspect of the present invention, the above method described with reference to step S1 to S14, the method may be adapted such that an input from, for example, a radiologist, causes that a measurement of the typical parenchymal Hounsfield value is determined at a point indicated by the radiologist. This allows that the radiologist pinpoints a suspicious region and then the texture based histogram method described above allows to perform a robust measurement, which is not compromised by solid lung structures. Then, by evaluating the output HU value, the radiologist may determine whether the pinpointed region contains an indicator for lung cancer or not. However, as indicated above, the determination as ground glass opacity can also be made automatically.

Figure 3:
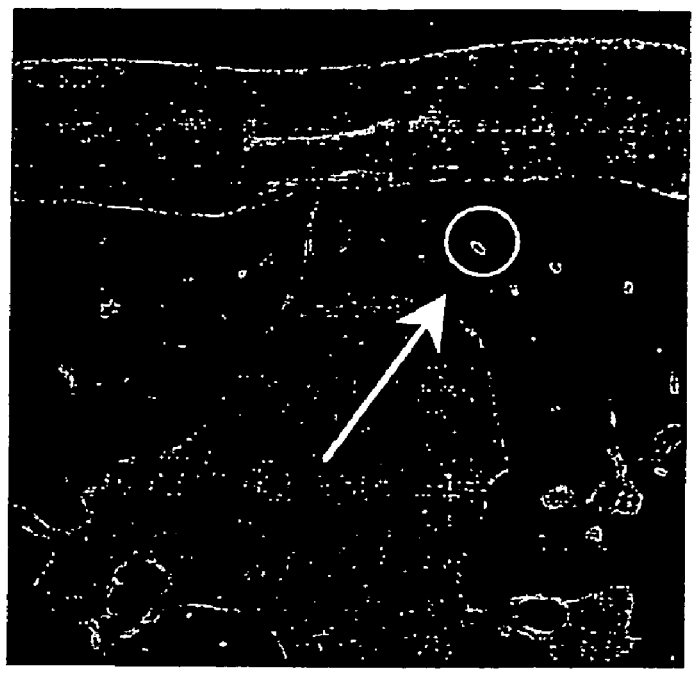
FIG. 3 shows a CT image slice of a portion of the lung, wherein a normal parenchyma tissue around a vessel is marked.

FIG. 3 shows a two-dimensional slice image of a part of the lung. The arrow and the circle in FIG. 3 indicate normal paranchymal tissue around a vessel.

Figure 4:
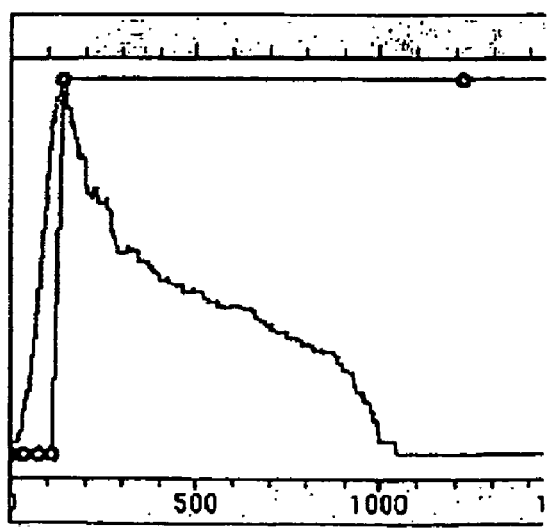
FIG. 4 shows a roughness-histogram corresponding to the normal parenchyma tissue marked in FIG. 3, determined in accordance with an exemplary embodiment of the present invention.

FIG. 4 shows the roughness-histogram of the area encircled in FIG. 3. The abscissa of FIG. 4 indicates gray values and the ordinate of FIG. 4 indicates Hounsfield units. As may be taken from FIG. 4, there is a steep incline from −1000 HU up to a gray value of approximately 120. At the gray value of 120, the peak reaches a Hounsfield value of −880 HU. Then, the histogram declines substantially linearly to a gray value of approximately 1050, where it reaches −1000 HU.

FIG. 4 shows the same two-dimensional slice image as FIG. 3. However, in contrast to FIG. 3, a different area, namely the area of a ground glass opacity as it may be determined according to the present invention is indicated by the arrow and encircled by the circled.

Figure 5:
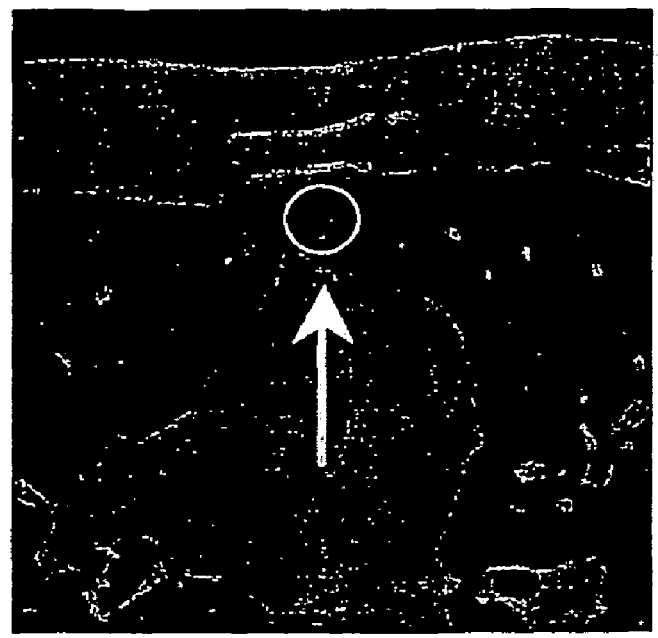
FIG. 5 shows a two-dimensional CT image of a portion of the lung, wherein a ground glass opacity is marked.
Figure 6:
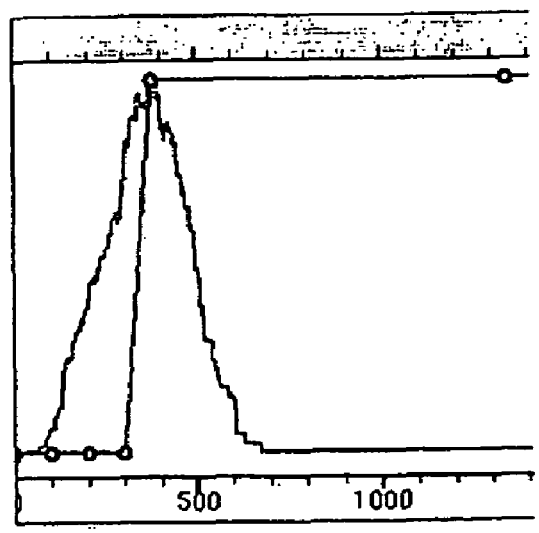
FIG. 6 shows a roughness-histogram of the ground glass opacity marked in FIG. 5, determined in accordance with an exemplary embodiment of the present invention.

FIG. 6 shows the roughness-histogram of the ground glass opacity of FIG. 5, i.e. of the area encircled by the circle in FIG. 5. The abscissa indicates the gray values, whereas the ordinate indicates Hounsfield units. As may be taken from FIG. 6, the roughness-histogram resembles a peak with steep descents from the peak down to the flanks, towards −1000 HU.

In detail, from a value of approximately 100, the roughness-histogram shows a steep incline up to the peak at a gray value of 390, where it reaches a peak of −610 Hounsfield units. Then, there is a steep decline, such that the roughness-histogram reaches −1000 HU at a gray value of approximately 700.

Advantageously, with the method depicted in FIGS. 2a and 2b, a differentiation between a normal parenchyma tissue around a vessel, as shown in FIG. 3, and a ground glass opacity, as shown in FIG. 5, may be made automatically, on the basis of the roughness-histogram.

As mentioned above, the above method may be implemented by means of a suitable computer program, which can be executed on a suitable image processor. The present invention may also be embodied in an image processing device, which is adapted to perform the above method of the present invention. In particular, an image processing device according to the present invention may be accommodated in a CT scanning system.

The invention claimed is:

1. A method for analyzing pulmonary three-dimensional CT data, wherein the three-dimensional CT data include a plurality of two-dimensional slice images having image elements, wherein values of the image elements correspond to Hounsfield units, the method comprising the steps of: loading the three-dimensional CT data; and performing a detection of ground glass opacities in the plurality of two-dimensional slice images of the three-dimensional CT data on the basis of a texture analysis, wherein the texture analysis includes the step of: determining a typical Hounsfield value of a local pulmonary parenchyma on the basis of a peak of a texture based roughness-histogram.

2. The method of claim 1, wherein the texture analysis includes the steps of: computing a typical parenchyma Hounsfield value for the lung; and marking all areas in the lung area with a Hounsfield value higher than the typical parenchyma Hounsfield value.

3. The method of claim 1, wherein the texture analysis includes the steps of: determining first image elements in the plurality of two-dimensional slice images belonging to the lung by performing a segmentation of the lung from in the plurality of two-dimensional slice images; and determining second image elements from the first image elements; wherein the second image elements belong to a solid structure.

4. The method of claim 3, wherein the determination of the second image elements belonging to a solid structure includes the steps of: a) determining a third starting image element of the first image elements; b) determining 8 directly neighbouring image elements for the third starting image element; c) determining a fourth image element of the 8 directly neighbouring image elements having the highest Hounsfield value; d) choosing the fourth image element having the highest Hounsfield value as new third starting image element and iteratively repeating steps a) to d).

5. The method of claim 3, wherein the texture analysis includes the steps of:
determining fifth image elements which are part of the first image elements but not part of the second image elements; sampling sixth image elements in a neighbourhood of each of the fifth image elements; determining a roughness histogram on the basis of the fifth and sixth image elements; accumulating the roughness histogram; determining a peak value of a peak in the accumulated roughness histogram; entering the peak value into a list structure in case the value exceeds a Hounsfield value of approximately −700 HU; and determining ground glass opacities in the lung from pulmonary three-dimensional CT data on the basis of the list structure.

6. Image processing device, comprising: a memory for storing pulmonary three-dimensional CT data, wherein the three-dimensional CT data include a plurality of two-dimensional slice images consisting of image elements, wherein values of the image elements correspond to Hounsfield units; and an image processor for analyzing the pulmonary three-dimensional CT data, which image processor is adapted to perform the following operation: loading the three-dimensional CT data; and performing a detection of ground glass opacities in the plurality of two-dimensional slice images of the three-dimensional CT data on the basis of a texture analysis, wherein the texture analysis includes the following operation: computing a typical parenchyma Hounsfield value for the lung; and marking all areas in the whole lung area with a Hounsfield value higher than the typical parenchyma Hounsfield value.

7. The image processing device of claim 6, wherein the texture analysis includes the following operation: determining a typical Hounsfield value of a local pulmonary parenchyma on the basis of a peak of a texture based roughness-histogram.

8. A computer readable medium containing instructions for controlling a computerized image processing device to analyze pulmonary three-dimensional CT data, wherein the three-dimensional CT data include a plurality of two-dimensional slice images having image elements, wherein the image elements correspond to Hounsfield units, the analyzing comprising the steps of: loading the three-dimensional CT data; and performing a detection of ground glass opacities in the plurality of two-dimensional slice images of the three-dimensional CT data on the basis of a texture analysis, wherein the texture analysis includes the steps of: determining first image elements in the plurality of two-dimensional slice images belonging to the lung by performing a segmentation of the lung from in the plurality of two-dimensional slice images; and determining second image elements from the first image elements; wherein the second image elements belong to a solid structure.

9. The computer readable medium of claim 8 wherein the texture analysis includes the step of: determining a typical Hounsfield value of a local pulmonary parenchyma on the basis of a peak of a texture based roughness-histogram.

10. The computer readable medium of claim 8 wherein the texture analysis includes computing a typical parenchyma Hounsfield value for the lung; and marking all areas in the whole lung area with a Hounsfield value higher than the typical parenchyma Hounsfield value.

11. The computer readable medium of claim 8 wherein the determination of the second image elements belonging to a solid structure includes the steps of: a) determining a third starting image element of the first image elements; b) determining 8 directly neighbouring image elements for the third starting image element; c) determining a fourth image element of the 8 directly neighbouring image elements having the highest Hounsfield value; d) choosing the fourth image element having the highest Hounsfield value as new third starting image element and iteratively repeating steps a) to d).

12. The computer readable medium of claim 8 wherein the texture analysis includes the steps of determining fifth image elements which are part of the first image elements but not part of the second image elements; sampling sixth image elements in a neighbourhood of each of the fifth image elements; determining a roughness histogram on the basis of the fifth and sixth image elements; accumulating the roughness histogram; determining a peak value of a peak in the accumulated roughness histogram; entering the peak value into a list structure in case the value exceeds a Hounsfield value of approximately −700 HU; and determining ground glass opacities in the lung from pulmonary three-dimensional CT data on the basis of the list structure.

13. The computer readable storage medium of claim 8 wherein determining second image elements includes identifying image elements that belong to the solid structure.

14. The computer readable storage medium of claim 13 wherein identifying image elements includes identifying a monotonic change in the value of image elements in the neighborhood of an image element.

15. The method of claim 1 including generating the texture based roughness-histogram, wherein generating includes:
determining a local variation in image element values in a spatial neighborhood of a first region of the image;
using a result of the determination to generate the texture based roughness histogram.

16. The method of claim 15 wherein determining includes:
comparing the value of a first image element to the value of a second image element that is a spatial neighbor of the first image element;
repeating the step of comparing for a plurality of image elements that are spatial neighbors of the first image element.

17. The method of claim 15 wherein the spatial neighborhood consists of a region within a neighborhood of about 5 to 10 mm of the first region.

18. The method of claim 15 including repeating the step of determining for a plurality of regions of the image.

19. The method of claim 1 comprising:
determining that a first image element does not belong to a solid structure of the lung;
sampling image elements in a spatial neighborhood of the first image element;
using a result of the sampling to produce the roughness histogram;
identifying the peak of the roughness histogram;
depending on the value of the identified peak, identifying the first image element as a potential ground glass opacity.

* * * * *